2,924,623

PROCESS FOR PREPARING CARBON TETRAFLUORIDE ESSENTIALLY FREE FROM OTHER HALOCARBONS

Glenn F. Hager, Hockessin, Del., assignor to E. I. du Pont de Nemours and Company, Wilmington, Del., a corporation of Delaware No Drawing. Application February 15, 1957
Serial No. 640,338

6 Claims. (Cl. 260—653)

This invention relates to an improved process of preparing carbon tetrafluoride. More particularly this invention relates to an improved process for preparing carbon tetrafluoride in relatively good conversions and essentially free from other halocarbons.

Carbon tetrafluoride is an important industrial chemical which finds uses as refrigerant liquid, dielectric fluid and ingredient of aerosol compositions, e.g., insecticidal compositions. It is also the starting material in a new process, described in U.S. Patent 2,709,192, of synthesizing the technically important tetrafluoroethylene.

Very few methods are available for preparing carbon tetrafluoride from inexpensive starting materials. A new synthesis of chlorofluorocarbons from carbon, chlorine and metal fluorides, e.g., calcium fluoride has been recently described in U.S. Patent 2,709,185. This process gives carbon tetrafluoride, but only in low conversions and as a by-product mixed with larger amounts of chlorofluorocarbons. The present invention constitutes an improved process whereby carbon tetrafluoride is obtained as the resulting product essentially free from other halocarbons and in much higher conversions than in U.S. Patent 2,709,185.

It is an object of this invention to provide an improved process for preparing carbon tetrafluoride. A further object is to provide an improved one-step process for preparing carbon tetrafluoride from inexpensive chemicals in relatively good conversions. Another object is to provide a process for preparing carbon tetrafluoride as the resulting product essentially free from other halocarbons. Other objects will appear hereinafter.

These objects are accomplished by the present invention wherein carbon tetrafluoride is prepared by a process which comprises bringing chlorine into contact with molten calcium fluoride and carbon at a temperature in the range of 1400–1800° C., the molar ratio of the calcium fluoride to the total chlorine used being at least 10:1 and the contact time between the chlorine and the calcium fluoride being in the range of 1–30 seconds, and isolating the fluorine-containing organic reaction product.

While the mechanism of the reaction is not known with certainty, the process can be essentially represented by the equation $C + 2CaF_2 + 2Cl_2 \rightarrow CF_4 + 2CaCl_2$ since carbon tetrafluoride constitutes nearly the total of the fluorine-containing organic reaction product. One or more of the three chlorofluoromethanes are also present, but in very small amount. The organic, alkali-insoluble reaction product normally contains at least 80%, and in general at least 90% of carbon tetrafluoride. Silicon tetrafluoride and hydrogen chloride often appear as by-products, being formed from impurities in the reactants which are difficult to remove. These by-products can readily be separated from the carbon tetrafluoride by washing the crude reaction product with aqueous alkali.

One of the important conditions for the successful operation of this process is the reaction temperature. It is necessary in order to accomplish the objects of this invention that the calcium fluoride be in the molten state, i.e. the liquid phase, which dictates a minimum operating temperature in the neighborhood of 1400° C. On the other hand, it has been found that conversions of chlorine to carbon tetrafluoride begin to decrease at about 1700° C. and that, above about 1800° C., the improvement over prior processes becomes less and less significant. Thus, the critical temperature range is 1400–1800° C., and preferably 1400–1700° C.

Another most important factor which is critical is the amount of calcium fluoride relative to the total chlorine employed. It has been found that substantial conversions of chlorine to carbon tetrafluoride, e.g., conversions normally exceeding 30%, are obtained only when the molar ratio of calcium fluoride to chlorine is at least 10:1. By this is meant the molar ratio of the total mass of molten calcium fluoride to the total chlorine employed, rather than the ratio of the two reactants in the system at any given time. Preferably, this ratio is between 12:1 and 35:1, although an even larger excess of calcium fluoride can be employed. The reason why this high ratio is needed is not clear, since the postulated equation requires only equimolar amounts of calcium fluoride and chlorine. It is possible that physical factors affecting the contact between the mass of molten calcium fluoride and the gaseous chlorine come into play.

In contrast, the amount of carbon present does not appear to be critical. However, it is desirably used in excess over the theoretical amount, e.g., in amounts corresponding to between about 2 and about 20 gram-atoms of carbon per mole of total chlorine employed.

Any form of carbon, whether amorphous or crystalline, is suitable for the purposes of this invention. Thus, there can be used anthracite, graphite, charcoal or the various forms of carbon black. Better conversions are obtained when the carbon is as free as possible from hydrocarbon impurities and silicon. However, the carbon need not be rigorously pure. The reactor is normally constructed of carbon (graphite), this being one of the very few materials capable of withstanding the action of chlorine at the high temperatures involved, and in such a case it is not essential, although it is desirable, that additional carbon be used since the graphite walls and/or the graphite inlet tube assembly can serve as the reactant, at least for runs of comparatively short duration.

The calcium fluoride can be the usual commercial grade, although better conversions are obtained with the higher grades, and particularly with calcium fluoride which has been treated to remove as much of the silicon present in it as possible. The reactants should be substantially anhydrous since the presence of water vapor in the system lowers the conversions.

An important advantage in the process of this invention is that the reaction proceeds at a fast rate under the conditions outlined above. For good results, the chlorine should be in contact with the molten calcium fluoride for at least one second and preferably for at least five seconds. However, contact times exceeding about 30 seconds are not recommended because the conversion of chlorine to carbon tetrafluoride is not improved and because the productivity of the equipment is decreased thereby. The preferred reaction time at the operating temperature is between 5 and 25 seconds.

Observance of the reaction conditions discussed above leads to a reaction product, the halocarbon portion of which contains at least 80% and normally at least 90% of carbon tetrafluoride on a molar basis. The remainder of the halocarbon portion consists chiefly of chlorotrifluoromethane, with dichlorodifluoromethane and trichlorofluoromethane being present in trace or minute amounts.

The conversion of chlorine to carbon tetrafluoride, based on the total amount of chlorine employed, is at least 30% and the yield of carbon tetrafluoride, based on the chlorine actually consumed, i.e., on the unrecovered chlorine, is at least 40% and can be as great as 90% or higher. The principal nonhalocarbon impurities in the crude reaction product are the unreacted chlorine, if any, as already mentioned, silicon tetrafluoride and hydrogen chloride. Other impurities which, when present, are found in trace amounts or at most in very small amounts are phosgene, carbonyl fluoride, carbonyl chlorofluoride, carbon oxysulfide, carbon dioxide and sulfur dioxide.

All the non-halocarbon components of the crude reaction product, as well as the unreacted chlorine, if any, can be separated from the halomethanes by washing the gaseous reaction product with aqueous alkali. The alkali-insoluble material can then be fractionated in a low temperature still to separate the halomethanes. However, for many applications the carbon tetrafluoride, as obtained directly, is sufficiently pure to make fractionation unnecessary. The fluorine-containing organic reaction product consists essentially of carbon tetrafluoride.

In a preferred mode of operation, batch-type equipment is used in which chlorine is passed, at or near atmospheric pressure or, if desired, at higher pressures, through a mixture of molten calcium fluoride and carbon. Any suitably designed apparatus can be used. In the specific examples which follow, the apparatus consisted of a graphite crucible suspended from a water-cooled copper head inside a water-cooled or air-cooled quartz vessel placed within an induction furnace, the crucible being surrounded by graphite powder insulation inside the quartz vessel. Chlorine, mixed with a carrier gas if desired, was led into the crucible through an inlet tube made of impervious graphite to prevent premature diffusion of the chlorine and terminating in a porous graphite diffuser near the bottom of the crucible. Above the point where it entered the copper head, the graphite inlet tube was connected to the source of chlorine and carrier gas through a water-cooled copper tube provided with a sight glass permitting optical pyrometric measurement of the inside temperature. The gaseous reaction product left the reactor through an outlet in the copper head holding the graphite crucible and was led to a collection system consisting of traps cooled down to $-195°$ C.

To operate using the above-described apparatus, the graphite crucible is charged with the calcium fluoride and the carbon to be used as reactants, and the gas outlet is connected to the cold traps. The entire system is evacuated while the crucible is heated inductively. When the reaction temperature is reached and the calcium fluoride has melted the system is brought back to atmospheric pressure by introduction of an inert gas such as nitrogen, helium or argon and the flow of chlorine at the rate of about 10–20 g. per hour, if desired mixed with a carrier gas, is begun. The chlorine comes in contact with the other reactants after bubbling out of the porous graphite diffuser, which is below the surface of the molten calcium fluoride. The product from the reactor is vented for some time, e.g., 1 to 1½ hours, while steady state conditions are being established. The product is then collected in the cold traps where it condenses, and it is transferred at the end of the reaction to a stainless steel cylinder for analysis and for distillation.

In another mode of practicing the process, a continuous flow reactor is used. For example, such a reactor can comprise a vertical tube of impervious graphite packed in the center with chips of graphite or amorphous carbon and held in a water-cooled jacket, where the graphite tube is surrounded by carbon black insulation. The tube and packing are heated to reaction temperature by means of an induction furnace. Solid calcium fluoride is introduced through a screw injector into the top portion of the tube and falls onto the carbon packing where it melts. Chlorine is simultaneously introduced at the required rate at the top of the graphite tube, and reacts with the molten calcium fluoride and the carbon in the center section of the tube. The solid effluent from the reaction zone is collected at the bottom of the graphite tube in a water-cooled receiver and the gaseous products are removed through a side arm to a cold trap collection system.

The use of another gas to serve as carrier and diluent for the chlorine is optional as has already been disclosed. In this connection, special mention may be made of carbon monoxide, which is highly suitable for that purpose. It is possible, although this has not been established, that carbon monoxide acts also as an additional source of carbon in the reaction. However other gases, such as helium, argon or nitrogen, can be used if desired as a carrier or diluent for the chlorine.

The invention is illustrated in greater detail by the following examples:

*Example I*

Through a mixture of 400 g. of molten calcium fluoride and 10 g. of graphite powder heated by induction at 1400–1420° C. in a batch-type reactor essentially similar to that described above was passed an equimolar mixture of helium and chlorine at the rate of 12 liters per hour. This rate of flow corresponds to a contact time of 6.3 seconds between the chlorine and the other reactants. During 1.5 hours, the total amount of chlorine led through the system was 28.5 g. and the molar ratio of calcium fluoride to chlorine was about 13:1. During that time there was collected 22.5 g. of reaction product in a trap cooled in liquid nitrogen. By infrared analysis this product was found to contain, on a molar basis, 20% of carbon tetrafluoride and minute or trace amounts of carbon dioxide, phosgene, carbonyl chlorofluoride and carbonyl fluoride. In addition, it contained unreacted chlorine, which does not absorb in the infrared but was found by iodometric analysis, which showed the presence of 10.4 g. of chlorine in the reaction product. The amount of carbon tetrafluoride in the reaction product was 5.5 g., corresponding to a conversion of chlorine to carbon tetrafluoride of about 31%, based on the equation $C+2CaF_2+2Cl_2 \rightarrow CF_4+8CaCl_2$. The yield of carbon tetrafluoride was 49% based on the chlorine actually consumed.

*Example II*

The importance of a high ratio of calcium fluoride to chlorine for the attainment of high conversions is shown by the following comparative experiments.

A graphite reactor of the type used in Example I was charged with 200 g. of calcium fluoride. No additional carbon was used, the carbon source being the reactor and the graphite diffuser. At a temperature of 1500° C. there was passed through the molten calcium fluoride during one hour 0.211 mole of chlorine mixed with 5 liters of helium. The molar ratio of calcium fluoride to chlorine was 12:1 and the contact time was 3.8 seconds. The collected exit gas (11.59 g.) was found to contain 4.61 g. of carbon tetrafluoride, 0.79 g. of chlorotrifluoromethane, 0.27 g. of hydrogen chloride and 5.92 g. of chlorine. The conversion of chlorine to carbon tetrafluoride was 49.6%.

This experiment was then essentially duplicated using 100 g. of calcium fluoride and 0.205 mole of chlorine (molar ratio 6.27:1). The contact time was 1.9 seconds. There was collected 12.45 g. of reaction product containing 2.96 g. of carbon tetrafluoride, 0.18 g. of chlorotrifluoromethane, 0.31 g. of hydrogen chloride, 0.52 g. of silicon tetrafluoride and 8.48 g. of chlorine. The conversion of chlorine to carbon tetrafluoride was only 27.5%.

*Example III*

A mixture of 400 g. of calcium fluoride and 40 g. of charcoal was placed in a batch-type reactor of the kind described above and heated to 1600° C. A mixture of 12 g. of chlorine with 3.2 liters of helium was passed during one hour through the reactor at a temperature of 1590–1610° C. The contact time was 9.7 seconds and the molar ratio of calcium fluoride to chlorine was 30.1. The product contained no unreacted chlorine. Infrared analysis showed that it contained 4.7 g. of carbon tetrafluoride, 0.2 g. of chlorotrifluoromethane, 0.3 g. of hydrogen chloride, 1.5 g. of silicon tetrafluoride, and traces of carbon oxysulfide, sulfur dioxide, dichlorodifluoromethane and trichlorofluoromethane. The conversion of chlorine to carbon tetrafluoride was 63%.

*Example IV*

The calcium fluoride used in this Example was given a special treatment designed to remove as much as possible of the silicon present as impurity. The purification procedure was as follows: Reagent grade calcium fluoride was made into particles of a size passing sieve openings of 1.1 to 2.3 mm. The particles were heated up to 500° C. in a stream of helium for two hours, then at 800° C. in a stream of chlorine for six hours, and finally in a stream of anhydrous hydrogen fluoride at 350° C. for six hours. This treatment yielded dry calcium fluoride and resulted in a decrease in the silicon content from about 1.0% to about 0.1%.

Using a batch-type reactor as described above, a mixture of 400 g. of purified calcium fluoride and 20 g. of spectrographically pure graphite powder was heated to 1535° C. and 12 g. of chlorine mixed with 1.5 liter of helium was passed through the mixture at that temperature during one hour. The contact time was 13.3 seconds and the calcium fluoride/chlorine molar ratio was 30:1. The reaction product contained, besides some unreacted chlorine, 6.6 g. of carbon tetrafluoride, 0.3 g. of silicon tetrafluoride and traces of dichlorodifluoromethane and phosgene. The conversion of chlorine to carbon tetrafluoride was 89%.

*Example V*

Using a batch-type graphite reactor, a mixture of carbon monoxide and chlorine in the volume ratio of approximately 2:1 was passed through 400 g. of molten calcium fluoride at 1580–1600° C. No additional source of carbon was used. A total of 23 g. of chlorine was passed through the system during a 70-minute period. The contact time was 4.2 seconds and the molar ratio of calcium fluoride to total chlorine was about 16:1. The reaction product was found by infared analysis to contain 30% of carbon tetrafluoride, 15% of hydrogen chloride, 5% of phosgene, 5% of chlorotrifluoromethane, 1% of dichlorodifluoromethane, 1% of carbonyl chlorofluoride, and small amounts of carbon dioxide, carbonyl fluoride and silicon tetrafluoride. It also contained 43% of unreacted chlorine. The conversion of chlorine to carbon tetrafluoride was about 37%.

This invention provides a one-step synthesis of carbon tetrafluoride from inexpensive chemicals. The carbon tetrafluoride is obtained in good conversion, based on the chlorine employed, and is essentially free from other halomethanes.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing carbon tetrafluoride which comprises bringing chlorine into contact with carbon and calcium fluoride in a molten state at a temperature within the range of 1400 to 1800° C. for a period of from 1 to 30 seconds, the molar ratio of said molten calcium fluoride to the total chlorine thus contacted being at least 10:1, and isolating the fluorine-containing organic reaction product containing at least 80% carbon tetrafluoride on a molar basis.

2. A process for preparing carbon tetrafluoride which comprises bringing chlorine into contact with carbon and calcium fluoride in a molten state at a temperature within the range of 1400 to 1700° C. for a period of from 1 to 30 seconds, the molar ratio of said molten calcium fluoride to the total chlorine thus contacted being from 12:1 to 35:1, and isolating the fluorine-containing organic reaction product containing at least 80% carbon tetrafluoride on a molar basis.

3. A process for preparing carbon tetrafluoride which comprises bringing chlorine into contact with carbon and calcium fluoride in a molten state at a temperature within the range of 1400 to 1800° C. for a period of from 5 to 25 seconds, the molar ratio of said molten calcium fluoride to the total chlorine thus contacted being at least 10:1, and isolating the fluorine-containing organic reaction product containing at least 80% carbon tetrafluoride on a molar basis.

4. A process for preparing carbon tetrafluoride which comprises bringing chlorine into contact with carbon and calcium fluoride in a molten state at a temperature within the range of 1400 to 1700° C. for a period of from 5 to 25 seconds, the molar ratio of said molten calcium fluoride to the total chlorine thus contacted being from 12:1 to 35:1, and isolating the fluorine-containing organic reaction product containing at least 80% carbon tetrafluoride on a molar basis.

5. A process for preparing carbon tetrafluoride which comprises bringing chlorine mixed with a diluent gas into contact with carbon and calcium fluoride in a molten state at a temperature within the range of 1400 to 1700° C. for a period of from 1 to 30 seconds, the molar ratio of said molten calcium fluoride to the total chlorine thus contacted being from 12:1 to 35:1, and isolating the fluorine-containing organic reaction product containing at least 80% carbon tetrafluoride on a molar basis.

6. A process for preparing carbon tetrafluoride which comprises bringing chlorine mixed with carbon monoxide into contact with carbon and calcium fluoride in a molten state at a temperature within the range of 1400 to 1700° C. for a period of from 1 to 30 seconds, the molar ratio of said molten calcium fluoride to the total chlorine thus contacted being from 12:1 to 35:1, and isolating the fluorine-containing organic reaction product containing at least 80% carbon tetrafluoride on a molar basis.

References Cited in the file of this patent

UNITED STATES PATENTS

| | | |
|---|---|---|
| 785,961 | Lyons et al. | Mar. 28, 1905 |
| 2,709,185 | Muetterties | May 24, 1955 |
| 2,835,711 | Wolfe et al. | May 20, 1958 |

UNITED STATES PATENT OFFICE
CERTIFICATE OF CORRECTION

Patent No. 2,924,623          February 9, 1960

Glenn F. Hager

It is hereby certified that error appears in the printed specification of the above numbered patent requiring correction and that the said Letters Patent should read as corrected below.

Column 2, line 16, for "molter" read -- molten --; column 4, line 41, the equation should appear as shown below instead of as in the patent:

$$C + 2CaF_2 + 2Cl_2 \longrightarrow CF_4 + 2CaCl_2.$$

column 5, line 45, for "infared" read -- infrared --; column 6, line 10, for "tera-" read -- tetra- --.

Signed and sealed this 6th day of September 1960.

(SEAL)
Attest:

ERNEST W. SWIDER
Attesting Officer

ROBERT C. WATSON
Commissioner of Patents